(12) United States Patent
Frankel et al.

(10) Patent No.: US 9,527,159 B2
(45) Date of Patent: Dec. 27, 2016

(54) LASER EMISSION-BASED CONTROL OF BEAM POSITIONER

(71) Applicant: Electro Scientific Industries, Inc., Portland, OR (US)

(72) Inventors: Joseph Frankel, Beaverton, OR (US); Bob Beauchaine, Gaston, OR (US); Doug Gibson, Hillsboro, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 208 days.

(21) Appl. No.: 14/214,787

(22) Filed: Mar. 15, 2014

(65) Prior Publication Data

US 2014/0312013 A1 Oct. 23, 2014

Related U.S. Application Data

(60) Provisional application No. 61/800,903, filed on Mar. 15, 2013.

(51) Int. Cl.
*B23K 26/08* (2014.01)
*B23K 26/04* (2014.01)

(52) U.S. Cl.
CPC .......... *B23K 26/0807* (2013.01); *B23K 26/04* (2013.01); *B23K 26/082* (2015.10); *B23K 26/083* (2013.01); *B23K 26/0853* (2013.01)

(58) Field of Classification Search
CPC ... B23K 26/0807; B23K 26/04; B23K 26/365; B23K 26/083; B23K 26/9853; B23K 26/082
USPC ......... 219/121.67, 121.68, 121.69, 121.61, 219/121.62, 121.85
See application file for complete search history.

(56) References Cited

U.S. PATENT DOCUMENTS

| | | | |
|---|---|---|---|
| 6,172,325 B1 | 1/2001 | Baird et al. | |
| 6,433,301 B1 | 8/2002 | Dunsky et al. | |
| 6,947,454 B2 | 9/2005 | Sun et al. | |
| 7,126,746 B2 * | 10/2006 | Sun ............ | B23K 26/0613 219/121.62 |
| 7,206,120 B2 | 4/2007 | Gross et al. | |
| 7,245,412 B2 | 7/2007 | Bruland et al. | |
| 7,605,343 B2 | 10/2009 | Lei et al. | |
| 7,616,669 B2 | 11/2009 | Grant et al. | |
| 7,887,712 B2 | 2/2011 | Boyle et al. | |
| 8,404,998 B2 | 3/2013 | Unrath et al. | |

(Continued)

FOREIGN PATENT DOCUMENTS

| | | |
|---|---|---|
| CN | 1561277 A | 1/2005 |
| CN | 101172319 A | 5/2008 |

(Continued)

OTHER PUBLICATIONS

The International Search Report for PCT/US20141030043, which corresponds to U.S. Appl. No. 14/214,787, issued Jun. 30, 2014, 3 pages.

(Continued)

*Primary Examiner* — Mark Paschall (57) ABSTRACT

A laser machining system (20) employs a fast positioner (68), such as a pair of galvanometer mirrors (70), that directs a beam axis (24) at a specified velocity to a start position of a cutting path (92) in coincidence with one of multiple laser pulses emitted from a laser (28) a constant laser pulse repetition rate, which runs independently of the relative position of the beam axis (24) with respect to the workpiece (26).

20 Claims, 7 Drawing Sheets

(56) References Cited

U.S. PATENT DOCUMENTS

| | | | | |
|---|---|---|---|---|
| 2001/0045419 A1* | 11/2001 | Dunsky | ............... | B23K 26/02 |
| | | | | 219/121.76 |
| 2003/0132208 A1* | 7/2003 | Cutler | ............... | B23K 26/08 |
| | | | | 219/121.72 |
| 2005/0270629 A1* | 12/2005 | Johnson | ............ | B23K 26/0626 |
| | | | | 359/305 |
| 2005/0279808 A1 | 12/2005 | Johnson | | |
| 2008/0093349 A1* | 4/2008 | Bruland | ............. | G02B 26/101 |
| | | | | 219/121.69 |
| 2011/0210105 A1 | 9/2011 | Romashko et al. | | |
| 2012/0083049 A1 | 4/2012 | Johnson et al. | | |

FOREIGN PATENT DOCUMENTS

| | | |
|---|---|---|
| CN | 1644297 B | 9/2011 |
| TW | 200804023 A | 1/2008 |
| TW | 201111082 A | 4/2011 |
| WO | WO 00/47361 | 8/2000 |

OTHER PUBLICATIONS

The Written Opinion for PCT/US20141030043, which corresponds to U.S. Appl. No. 14/214,787, issued Sep. 15, 2015, 4 pages.
English translation of the Jun. 20, 2016 Office action concerning Taiwanese Patent Application No. 103110047, which corresponds with the subject U.S. Appl. No. 14/214,787.
English translation of the Jun. 27, 2016 Office action concerning Chinese Patent Application No. 201480015616.4, which corresponds with the subject U.S. Appl. No. 14/214,787.

* cited by examiner

LASER EMISSION-BASED CONTROL OF BEAM POSITIONER

RELATED APPLICATION

This application is a non-provisional application of U.S. Provisional Application No. 61/800,903, which was filed on Mar. 15, 2013, the contents of which are herein incorporated by reference in their entirety for all purposes.

COPYRIGHT NOTICE

©2014 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This application relates to systems and methods for synchronizing beam position with laser firing and, in particular, to systems and methods for synchronizing the workpiece and beam axis positions with the timing of laser pulse emissions.

BACKGROUND

Laser processing systems commonly coordinate the firing of laser pulses to positions on a workpiece by means of a trigger signal that is generated by the beam-positioning system and delivered to the laser control electronics as an external input. In such methodologies, the beam-positioning system can be considered to be the "master" and the laser is considered to be the "slave" because the timing decisions about when to fire the laser are wholly computed and determined by the beam-positioning system. The trigger signal from the beam-positioning system causes the laser control electronics to activate a pulse initiation device, such as a Q-switch, to cause a laser pulse to be emitted.

Some of these positioning-based machining systems strive to minimize pulse energy variability with an "off by default" approach, wherein laser pulses are only fired when the beam positioner arrives at target locations. The low laser power, nature of this process, and system architecture result in a relatively low duty cycle of laser pulses in such systems. In some wafer-dicing laser-machining systems, a galvanometer controller arbitrarily sends trigger signals to a Q-switch to initiate laser pulse emission when the beam axis directed by the galvanometer mirrors arrives at the desired position at a known velocity.

The problem with the above-described "laser follows beam positioner" scenario is that lasers perform best, and their pulse parameters are more consistent, when the lasers are operated at a steady state. Moreover, any non-constant starting, stopping, or frequency changes in timing of the trigger signal pulse train sent to the Q-switch will result in undesirable transients in the laser output beam, such as initial hot pulses, low-frequency average power drift, and increased pulse-to-pulse pulse width variability and peak power variability. These variations reduce control of laser parameters applied to the work surface, thereby reducing processing window, and may degrade laser-processing quality. U.S. Pat. No. 6,172,325 of Brian Baird et al. and U.S. Pat. No. 7.61,669 of Keith Grant et al. describe improvements in beam position-based laser-synchronization methods in which the beam-positioning system is the master. These patents are both assigned to the assignee of this application and are both incorporated herein by reference.

SUMMARY

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

In some embodiments, a method for coordinating beam axis position and beam axis velocity with laser emission at a constant laser pulse repetition rate, comprises: generating a beam of laser pulses at a constant laser pulse repetition rate for propagation along an optical path from a laser; employing a fast positioner that is positioned along the optical path and operable for directing a beam axis of the optical path in a movement pattern over a workpiece, wherein the movement pattern includes directing the beam axis over noncutting areas on the workpiece and directing the beam axis at a beam axis velocity over a cutting path between start and end positions relative to the workpiece to deliver the laser pulses at the laser pulse repetition rate and at an irradiance to change a physical characteristic of the workpiece along the cutting path; employing a pulse-picking device to allow or prevent selected ones of the laser pulses from propagating along the optical path to the workpiece, wherein the laser pulses that are allowed to propagate to the workpiece are working laser pulses, and wherein the laser pulses that are prevented from propagating to the workpiece are nonworking laser pulses; employing a controller operable for receiving laser processing parameters for changing the physical characteristic of the workpiece and for providing control signals directly or indirectly to the laser, the beam-positioning system, and the pulse-picking device, wherein the laser processing parameters include or determine the laser pulse repetition rate, the cutting path, the beam axis velocity, and the irradiance; employing a timing device in communication with or associated with the controller, wherein the timing device is operable to cause laser triggering signals to be sent to the laser triggering device at a constant repetition rate to cause the laser pulse repetition rate of the laser to be constant, thereby to cause emission of the laser pulses to be constant so that they exhibit stable and predictable pulse characteristics; and employing processing circuitry associated with the controller and operable for providing fast positioner control signals to the fast positioner to direct the beam axis to move along the cutting path over the workpiece; wherein, based on the laser pulse repetition rate, the processing circuitry is operable cause the beam axis to be directed to the start position relative to the workpiece and to be moving at the beam axis velocity when a first one of the working laser pulses impinges the workpiece; and wherein one or more pulse-picker signals gated through the timing device are operable to cause the pulse-picking device to prevent propagation of nonworking laser pulses over non-cutting areas of the workpiece and to permit propagation of working laser pulses to impinge the workpiece over the cutting path including and between the start and end positions relative to the workpiece.

In some embodiments, a laser machining system for processing a workpiece having a surface, comprises: a laser including a laser triggering device operable for causing emission of laser pulses at a laser pulse repetition rate for propagation along an optical path from the laser; a beam-positioning system including a fast positioner that is positioned along the optical path and operable for directing a beam axis of the optical path in a movement pattern over a workpiece, wherein the movement pattern includes directing the beam axis over noncutting areas on the workpiece and directing the beam axis at a beam axis velocity over a cutting path between start and end positions relative to the workpiece to deliver the laser pulses at the laser pulse repetition rate and at an irradiance to change a physical characteristic of the workpiece along the cutting path; a pulse-picking device that is positioned along the optical path and that is operable for allowing or preventing selected ones of the laser pulses from propagating along the optical path to the workpiece, wherein the laser pulses that are allowed to propagate to the workpiece are working laser pulses, and wherein the laser pulses that are prevented from propagating to the workpiece are nonworking laser pulses; a controller operable for receiving laser processing parameters for changing the physical characteristic of the workpiece and for providing control signals directly or indirectly to the laser, the beam-positioning system, and the pulse-picking device, wherein the laser processing parameters include or determine the laser pulse repetition rate, the cutting path, the beam axis velocity, and the irradiance; a timing device associated with the controller, wherein the timing device is operable to cause laser triggering signals to be sent to the laser triggering device at a constant repetition rate to cause the laser pulse repetition rate of the laser to be constant, thereby to cause emission of the laser pulses to be constant so that they exhibit stable and predictable pulse characteristics; and processing circuitry associated with the controller and operable for providing fast positioner control signals to the fast positioner to direct the beam axis to move along the cutting path over the workpiece; wherein, based on the laser pulse repetition rate, the processing circuitry is operable cause the beam axis to be directed to the start position relative to the workpiece and to be moving at the beam axis velocity when a first one of the working laser pulses impinges the workpiece; and wherein one or more pulse-picker signals gated through the timing device are operable to cause the pulse-picking device to prevent propagation of nonworking laser pulses over noncutting areas of the workpiece and to permit propagation of working laser pulses to impinge the workpiece over the cutting path including and between the start and end positions relative to the workpiece.

In some alternative or additional embodiments, the processing circuitry is operable to account for laser pulse propagation delay between transmission of the pulse-picker signal and arrival of the first working laser pulse at the surface of the workpiece.

In some alternative, additional, or cumulative embodiments, the processing circuitry is operable to account for pulse-picker propagation delay between transmission of the pulse-picker signal and operational ability of the pulse picker to switch from preventing propagation of nonworking laser pulses to allowing propagation of working laser pulses over the workpiece.

In some alternative, additional, or cumulative embodiments, the processing circuitry is operable to account for fast positioner delay between transmission of the fast positioner control signals and direction of the beam axis to the start position relative to the workpiece at the beam axis velocity.

In some alternative, additional, or cumulative embodiments, the processing circuitry is operable to account for pulse-picker lead time between an effective change of the pulse picker from preventing propagation of nonworking laser pulses to allowing propagation of working laser pulses over the workpiece and the passage of the first working laser pulse through the pulse picking device.

In some alternative, additional, or cumulative embodiments, the processing circuitry is operable to account for pulse-picker lag time between an effective change of the pulse picker from allowing propagation of working laser pulses to preventing propagation of nonworking laser pulses over the workpiece and the passage through the pulse-picking device of the working laser pulse impinging the end position of the cutting path over the workpiece.

In some alternative, additional, or cumulative embodiments, the fast positioner has a utilizable scan field that is large enough to contain the movement pattern, and wherein the fast positioner is operable to repeat the movement pattern over multiple passes within the utilizable scan field.

In some alternative, additional, or cumulative embodiments, the workpiece is sufficiently large to include first and second adjacent utilizable scan fields of the fast positioner, wherein the end position of a first cutting path in the first scan field is adjacent to the start position of a second cutting path in the second cutting path, and wherein the physical characteristic changed by laser impingement is the same along the first cutting path, the second cutting path, and at their connection point.

In some alternative, additional, or cumulative embodiments, the laser triggering device comprises a Q-switch, and/or the fast positioner comprises a pair of galvanometer mirrors, and/or the pulse-picking device comprises an AOM, and/or the timing device comprises a field programmable gate array, and/or the processing circuitry comprises a digital signal processor, and/or the workpiece has a thickness of less than 1 mm.

In some alternative, additional, or cumulative embodiments, the laser comprises a mode locked laser, and/or the laser triggering device comprises an internal clock within the laser, and/or the fast positioner comprises a pair of galvanometer mirrors, and/or the pulse-picking device comprises an AOM, and/or the timing device comprises a field programmable gate array, and/or the processing circuitry comprises a digital signal processor, and/or the workpiece has a thickness of less than 1 mm.

In some alternative, additional, or cumulative embodiments, the fast positioner has a fixed position within the laser machining system, and wherein the workpiece is supported by a stage that moves relative to the fixed position of the fast positioner.

One of many advantages of these embodiments is that the laser pulses have consistent, stable, predictable parameters.

Additional aspects and advantages will be apparent from the following detailed description of preferred embodiments, which proceeds with reference to the accompanying drawings.

DETAILED DESCRIPTION OF PREFERRED EMBODIMENTS

Example embodiments are described below with reference to the accompanying drawings. Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of components may be exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

Figure 1:
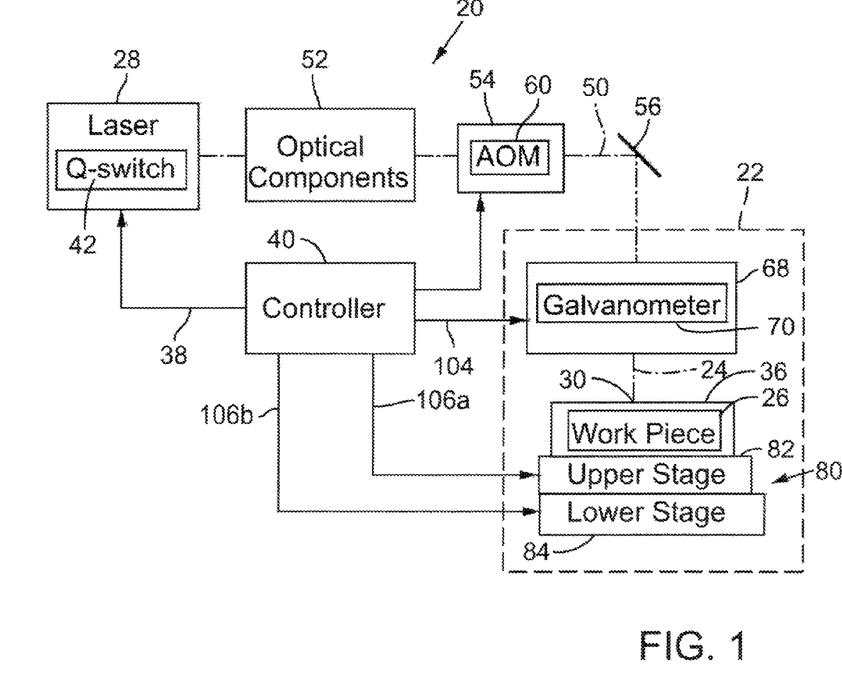
FIG. 1 is a schematic diagram of a simplified laser-machining system employing a beam-positioning system.

FIG. 1 is a schematic diagram of a simplified laser micromachining system 20 employing a beam-positioning system 22 capable of implementing laser-based control of positioning a beam axis 24 on a workpiece 26. Embodiments described herein reverse the master/slave relationship between the beam-positioning system and the laser 28 such that the "beam-positioning system 22 follows the laser 28." Rather than firing laser pulses from the laser 28 when the beam-positioning system 22 directs the beam axis 24 at a desired spot position 30 on a surface 36 of a workpiece 26 and at a desired velocity with respect to the workpiece 26, a pulse train sent by a controller 40, along a Q-switch signal path 38 to a Q-switch 42 within the laser cavity of the laser 28, can be maintained at a constant frequency after the laser system is initialized. The pulse train of Q-switch command trigger signals can be selected to provide a laser repetition rate that falls within a laser-processing window for a given operation on a workpiece 26 and falls within operational parameters of the laser 28 that are suitable for maintaining consistent laser output. The trigger signals are not stopped, started, or otherwise frequency shifted after initialization so that laser cavity instability is minimized.

As the laser pulses are generated in response to the Q-switch command trigger signals, the trajectory of the beam axis 24 of the beam positioning system 22 is adjusted slightly in time and space to align with the output of the laser 28, so that the beam axis 24 arrives at the desired spot position 30 and velocity when the desired laser pulses arrive at the surface 36 of the workpiece 26. Moreover, the timing of laser pulse emissions from the laser 28 is oblivious to the position of the beam axis 24 with respect to the workpiece 26. This capability employs constraints on the combined beam positioning and laser power control architecture as implemented by the controller 40 and utilizes high-speed digital processing, as well as accurately calibrated timing between digital laser controllers and beam-positioning controllers.

One advantage of keeping the laser pulses firing at a constant and uninterrupted rate is that the laser 28 does not experience the transients in the laser cavity, and therefore produces the most consistent laser pulses that it is capable of producing.

Exemplary laser pulse parameters include laser type, wavelength, pulse duration, pulse repletion rate, number of pulses, pulse energy, pulse temporal shape, pulse spatial shape, and focal spot size and shape. Additional laser pulse parameters include specifying the location of the focal spot relative to the surface 36 of the workpiece 26 and directing the relative motion of the laser pulses with respect to the workpiece 26.

In some embodiments, laser parameters that may be advantageously employed for some embodiments include using lasers 28 with wavelengths that range from IR through UV, or more particularly from about 10.6 microns down to about 266 nm. The laser 28 may operate at 2 W, being in the range of 1 W to 100 W, or more preferably 1 W to 12 W. Pulse durations range from 1 picosecond to 1000 ns, or more preferably from about 1 picosecond to 200 ns. The laser repetition rate may be in a range from 1 KHz to 100 MHz, or more preferably from 10 KHz to 1 MHz. Laser fluence may range from about $0.1 \times 10^{-6}$ J/cm$^2$ to 100 J/cm$^2$ or more particularly from $1.0 \times 10^{-2}$ J/cm$^2$ to 10 J/cm$^2$. The speed with which the beam axis 24 moves with respect to the workpiece 26 ranges from 1 mm/s to 10 m/s, or more preferably from 100 mm/s to 1 m/s. The major spatial axis of a stationary laser spot 32 (FIG. 5) measured at the surface 36 of the workpiece 26 may range from 10 microns to 1000 microns, or from 50 microns to 500 microns. The velocity of the beam axis 24 may increase the effective size of the laser spot 32 on the workpiece 26. In some embodiments, the spot size may be considered to represent the beam waist of a laser pulse at $1/e^2$, FWHM.

Almost any type of laser 28 can be employed. Some embodiments employ a solid-state diode-pumped laser 28, which can be configured to emit wavelengths from about 366 nm (UV) to about 1320 nm (IR) at pulse repetition rates up to 5 MHz. However, these systems may be adapted by the substitution or addition of appropriate laser, laser optics, parts handling equipment, and control software to reliably and repeatably produce the selected laser spots 32 on the workpiece 26 as previously described. These modifications permit the laser processing system to direct laser pulses with the appropriate laser parameters to the desired positions on an appropriately positioned and held workpiece 26 at the desired rate and bite size between laser spots 32.

In some embodiments, a mode locked-laser can be employed, in which case an internal clock is used to trigger the laser pulses at a specified frequency.

In some embodiments, the laser-machining system 20 employs a Coherent Avia diode-pumped, solid-state, Q-switched laser with emission at 532 nm, 355 nm or 266 nm, with output powers as high as 45 W at 532 nm.

In some embodiments, the laser-machining system 20 employs a diode-pumped Nd:YVO$_4$ solid-state laser 28 operating at 1064 nm wavelength, such as a model Rapid manufactured by Lumera Laser GmbH, Kaiserslautern, Germany. This laser can be optionally frequency doubled using a solid-state harmonic frequency generator to reduce the wavelength to 532 nm thereby creating visible (green) laser pulses, or tripled to about 355 nm or quadrupled to 266 nm thereby creating ultraviolet (UV) laser pulses. This laser 28 is rated to produce 6 Watts of continuous power and has a maximum pulse repetition rate of 1000 KHz. This laser 28 produces laser pulses with duration of 1 picosecond to 1,000 nanoseconds in cooperation with the controller 40.

These laser pulses may be Gaussian or specially shaped or tailored by the laser optics, typically comprising one or more optical components positioned along an optical path 50, to permit desired characteristics of the laser spots 32. Specially shaped spatial profiles may be created using diffractive optical elements or other beam-shaping components. A detailed description of modifying the spatial irradiance profile of laser spots 32 can be found in U.S. Pat. No. 6,433,301 of Corey Dunsky et al., which is assigned to the assignee of this application, and which is incorporated herein by reference.

With reference again to FIG. 1, the laser 28 of an exemplary laser micromachining system 20 emits a beam of laser pulses along an optical path 50 that propagates through a variety of optical components 52, a pulse-picking device 54, one or more fold mirrors 56, and to a fast-positioner 68 of the beam-positioning system 22 which ultimately directs the beam axis 24 of the optical path 50 onto a spot position 30 on the surface 36 of the workpiece 26. The optical components 52 may include a variety of well-known optics such as beam expander lens components, optional attenuators such as acousto-optic or electro-optic devices, and/or feedback sensors such as for energy, timing, or position, that are positioned a various positions along the optical path 50.

The pulse-picking device 54 acts as a high-speed shutter that blocks or permits laser pulses from propagating further along the optical path and determines which laser pulses are permitted to impinge on the workpiece 26. The pulse-picking device 54 may include an electro-optic device or an acousto-optic modulator (AOM) 60. For convenience, the pulse picker 54 will be discussed herein by way of example to the AOM 60. The AOM 60 is responsive to AOM command signals that are delivered along an AOM signal path 58 from the controller 40. The AOM command signals cause a transducer on the AOM 60 to initiate sound waves in the AOM that cause a beam propagating through the AOM 60 be diverted along predetermined exit angles that either align or don't align with the optical path 50 to the fast positioner 68.

Figure 4:
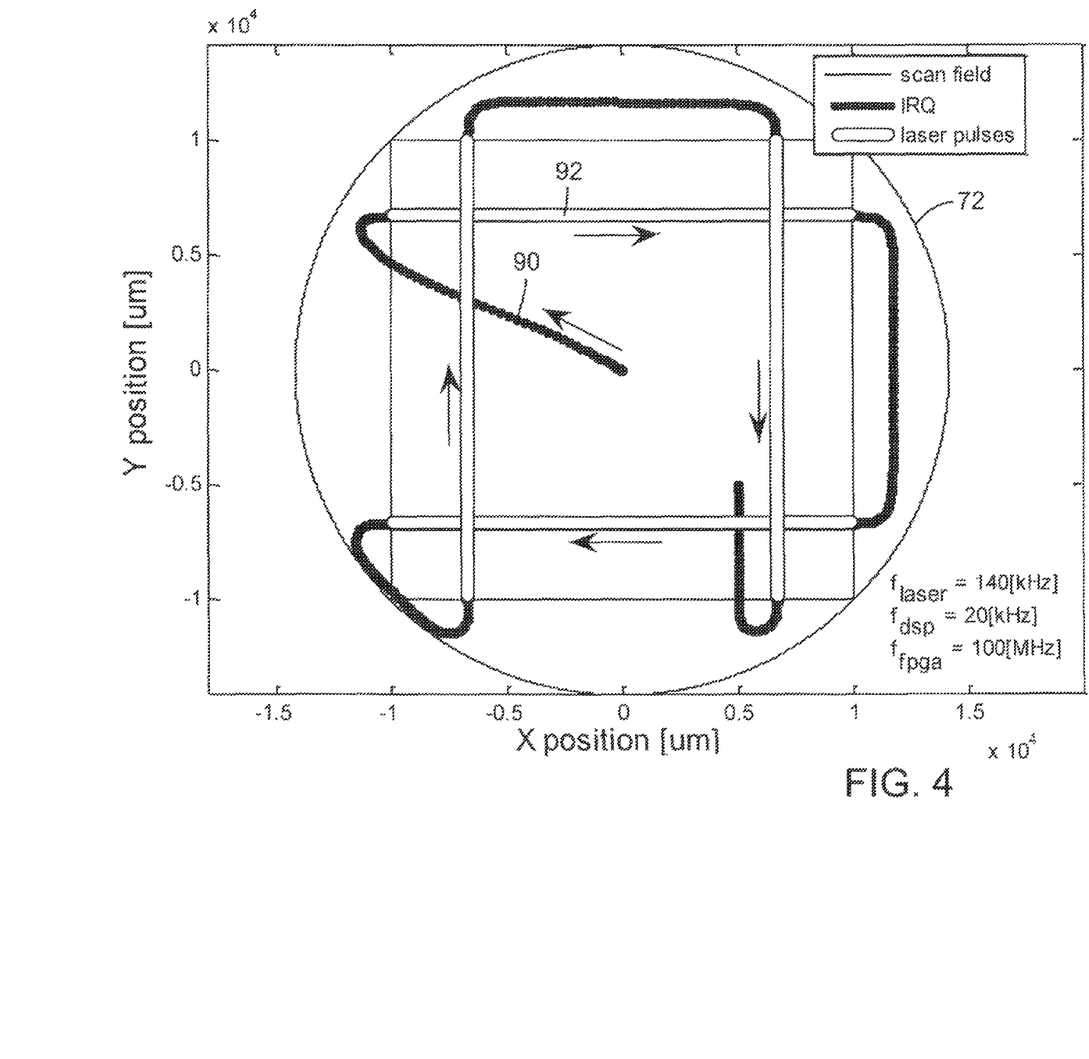
FIG. 4 is a top plan view of a representative move pattern of a laser beam axis across a two-axis scan field of galvanometer mirrors.

The fast positioner 68 may include any high-speed beam-positioning device having a relatively large scanning field 72 (FIG. 4). In some embodiments, the fast positioner 68 may include a pair of galvanometer-driven X-axis and Y-axis mirrors 70 capable of quickly changing the direction of the beam axis 24 over a relatively large field of view 72 over the workpiece 26. In some embodiments, the utilizable field of view 72 has a diameter (or major axis) of 10 mm to 100 mm. In some embodiments, the utilizable field of view 72 has a diameter that is greater than 15 mm. In some embodiments, the utilizable field of view 72 has a diameter of 25 mm to 50 mm. In some embodiments, the utilizable field of view 72 has a diameter that is smaller than 75 mm. In some embodiments, the utilizable field of view 72 may include galvanometer movement areas not usable for laser processing due to edge effects of the scanning lens, so the utilizable processing field may be smaller than the utilizable field of view 72.

Depending on the size of the desirable scan field 72, the fast positioner 68 may alternatively employ a high-speed positioner, such as an acousto-optic device or a deformable mirror (or other fast steering mirror), even though these devices tend to have smaller beam deflection ranges than galvanometer mirrors 70. Alternatively, a high-speed positioner may be employed in addition to the galvanometer mirrors 70 and can be integrated with the control and movement of the beam axis 24 provided by the galvanometer mirrors 70 or can be superimposed on the movement of the beam axis 24 provided by the galvanometer mirrors 70, such as for error correction. In some embodiments, the fast positioner 68 is supported in a fixed position over the workpiece 26. In other embodiments, the fast positioner 68 is supported by a stage that is moveable with respect to the workpiece 26, such as in a split-axis system. An exemplary fast positioner 68 has a bandwidth of hundreds of kilohertz and is capable of a linear velocity from about 2 or 3 m/s to about 10 m/s and an acceleration of about 1000 to 2000 G. Naturally, the linear velocity can operate below these ranges as well.

In some embodiments, the beam-positioning system 22 employs a workpiece-positioning stage 80 that preferably controls at least two platforms, such as an upper stage 82, which supports the workpiece 26, and a lower stage 84, which supports the upper stage 82. These upper and lower stages 82 and 84 are typically moved by linear motors and are commonly referred to as X-Y stages, with the upper stage 82 moveable in one axis and the lower stage moveable in the other axis. A typical workpiece-positioning stage 80 has a bandwidth of tens of kilohertz and is capable of a velocity of 2 or 3 m/sec and an acceleration of 1.5 G or greater. Current cost effective translation stages perform in a range of about 400 mm/s to about 1 m/s. Naturally, they can move much more slowly as well. The working envelope of the workpiece-positioning stage 80 is typically much larger than the field of view 72 of the galvanometer mirrors 70.

In some embodiments, the laser machining system 20 performs laser dicing in a step and repeat manner, wherein the workpiece-positioning stage 80 moves the workpiece 26 to a position with respect to the fast positioner 68 and beam axis 24 such that the workpiece position is maintained during the dicing operation which is conducted by the fast positioner 68. In particular, the workpiece-positioning stage 80 may position specific areas of the workpiece 26 within the utilizable field of view 72 of the galvanometer mirrors 70. The galvanometer mirrors 70 may direct the beam axis 24 to perform one or more movement patterns 90 that include one or more cutting paths 92 within the scan field 72 over the workpiece 26 while the workpiece-positioning stage 80 may be completely stopped over the scan field 72. In some embodiments, for desirable throughput, the beam axis 24 does not come to rest until all of the passes of the movement patterns 90 over a given scan field 72 are completed.

After one or more passes of the beam axis 24 in the movement patterns 90, the workpiece-positioning stage 80 may move to position the scan field 72 of the galvanometer mirrors 70 over a different area of the workpiece 26, such as a neighboring area. Thus for some embodiments, no laser processing occurs while the beam axis is accelerating. The advantages of using a beam axis with constant velocity movement and constant repetition rate pulses include stable and predictable laser pulse characteristics.

In some embodiments, laser dicing is conducted by generating a stream of laser pulses separated by a known spacing to achieve a desired irradiance at a known velocity of the beam axis 24 along the cutting path 92 on the workpiece 26. This process can be repeated using varying offsets in the start position of the first laser pulse along the cutting path 92 from pass to pass, evenly distributing the cumulative irradiance at any one spot position until the workpiece 26 has been machined to the desired parameters. However, neither pulse separation nor pass separation are required. So, a pass may contain overlapping pulses having a pulse separation that is smaller than the spot size, and sequential passes of pulses need not be spatially offset.

Some exemplary laser processing systems including some or all of the aforementioned components and operable for making kerfs along cutting paths 92 (FIG. 4) on or within the workpiece 26 are the ESI 5320, MM5330, ML5900, and 5955 micromachining systems, and the ESI 9900 and 9970 wafer dicing systems, all manufactured by Electro Scientific Industries, Inc., Portland, Oreg. 97229.

In some embodiments, the fast positioner 68 and the workpiece-positioning stage 80 receive commands from the controller 40. The galvanometer mirrors 70 may receive galvanometer command signals directly or indirectly from the controller 40 along one or more galvanometer signal paths 104. The upper and lower stages 82 and 84 may receive workpiece-positioning stage 80 command signals directly or indirectly from the controller along a single stage path or independently along separate stage signal paths 106a and 106b. Subcontrollers may be positioned along any of the signals paths as desirable to change the nature of the command signals or affect their timing. For example, the galvanometer mirrors may employ a JANUS analogue interface/driver module.

In some embodiments, to implement the laser-based positioning techniques disclosed herein, the controller 40 employs a master clock or timing device, such as a field programmable gate array (FPGA). In some embodiments, the FPGA has a fundamental clock rate, $f_{fgpa}$ [Hz], which is typically selected to be the fastest rate at which it can update its registers. Certain other parameters, such as an interrupt rate and a laser repetition rate, may also be exogenous inputs to the controller 40 that are selected a priori.

For example, the DSP interrupt rate, $f_s$ [Hz], is the servo interrupt rate at which the digital signal processor (DSP) in the controller 40 executes the real-time execution loop. The FPGA generates the interrupts for the DSP via an interrupt request (IRQ) output. The interrupt may be slightly different due to the quantization effects in the FPGA if the interrupt is not an integer multiple of the $f_{fgpa}$ [Hz]. This condition is assumed for this example.

The laser repetition rate, $f_{laser}$ [Hz], equals repetition rate of the laser pulses emitted from the laser cavity of the laser 28. The actual repetition rate may be slightly different due to the quantization effects in the FPGA if the actual repetition rate is not an integer multiple of the $f_{fgpa}$ [Hz]. This condition is not assumed for this example.

Certain parameters, such as laser propagation delay, AOM propagation delay, servo lag time, AOM-laser lead time, and AOM-laser lag time, can be calibrated for particular laser system components and relative movement velocities of the galvanometer mirrors 70 across the scan field 72.

The laser propagation delay, $T_{laser\_prop}$ [s], is the estimated time from the output of a Q-switch command pulse from the FPGA to the arrival of the laser pulse at the surface of the workpiece 26.

The AOM propagation delay, $T_{aom\_prop}$ [s], is the estimated time from the output of the rising/falling edge of the AOM command register from the FPGA to a fully excited AOM crystal state in which a laser pulse can be propagated along the desired optical path exiting the AOM 60 at the desired attenuation level, i.e, $T_{aom\_prop}$ [s] is the time that the AOM 60 takes to "open" or "close" in response an AOM command signal. In some embodiments, the desired optical path exiting the AOM 60 is a first order optical path.

The servo lag, $K_{lag}$ [s$^2$/m], is a scale factor estimating the time delay between the galvanometer mirror command signal and the position on the workpiece 26 at a constant velocity of relative movement between the workpiece 26 and the beam axis 24 as moved by the galvanometer mirror 70.

The AOM-laser lead time, $T_{aom\_lead}$ [s], is the specified time between the AOM opening and the first laser pulse that will pass through AOM 60 to the surface 36 of the workpiece 26 along the cutting path 92. The AOM-laser lead time is selected to be less than the laser period associated with the laser repetition rate, $f_{laser}$.

The AOM-laser lag time, $T_{aom\_lag}$ [s], is the specified time between the last laser pulse passing through the AOM 60 to the surface 36 of the workpiece 26 and the AOM closing. This time is selected to be less than the sum of the AOM propagation delay $T_{aom\_prop}$ and the laser period associated with the laser repetition rate, $f_{laser}$.

Recipe parameters, such as dice lane starting position, dice lane ending position, nominal pulse separation, nominal pass velocity, and profiled move time, can be selected by a user or determined by the controller 40 based on user input, position data, look-up tables, and/or profiling software.

The dice lane starting position, $p_1$ [µm], is the desired starting point of the laser cutting path 92 in galvanometer mirror coordinates relative to the current position of the X-Y workpiece stages 82 and 84.

The dice lane ending position, $p_2$ [µm], is the desired ending point of the laser cutting path 92 in galvanometer mirror coordinates relative to current position of the X-Y workpiece stages 82 and 84 based on the recipe parameters.

The nominal pulse separation, $\Delta p_{pulse}$ [µm], is the desired distance between laser pulses impinging the surface 36 of the workpiece 26. This value can be adjusted slightly due to quantization effects in the real-time control system.

The nominal pass velocity, $V_{pass}$ [µm/s], is the desired velocity of the beam axis 24 at the surface 36 of the workpiece 26 based on the recipe parameters. This value can also be adjusted slightly due to quantization effects in real time control system.

The profiled move time, $t_{prof}$ [s], is the time required to make the profiled (acceleration constrained) portion of the move leading up to the constant velocity cutting path section of the move over the workpiece 26. This value is can be computed with profiling software in the controller 40 or other system computer and may be referred to as the move time calculator.

Real-time measurements include the laser pulse phase offset, $t_\phi$ [s], which is the amount of time that has elapsed from the Q-switch pulse until the start of the DSP interrupt cycle in which the cut along the cutting path 92 begins. This value is supplied by the FPGA.

Figure 2:
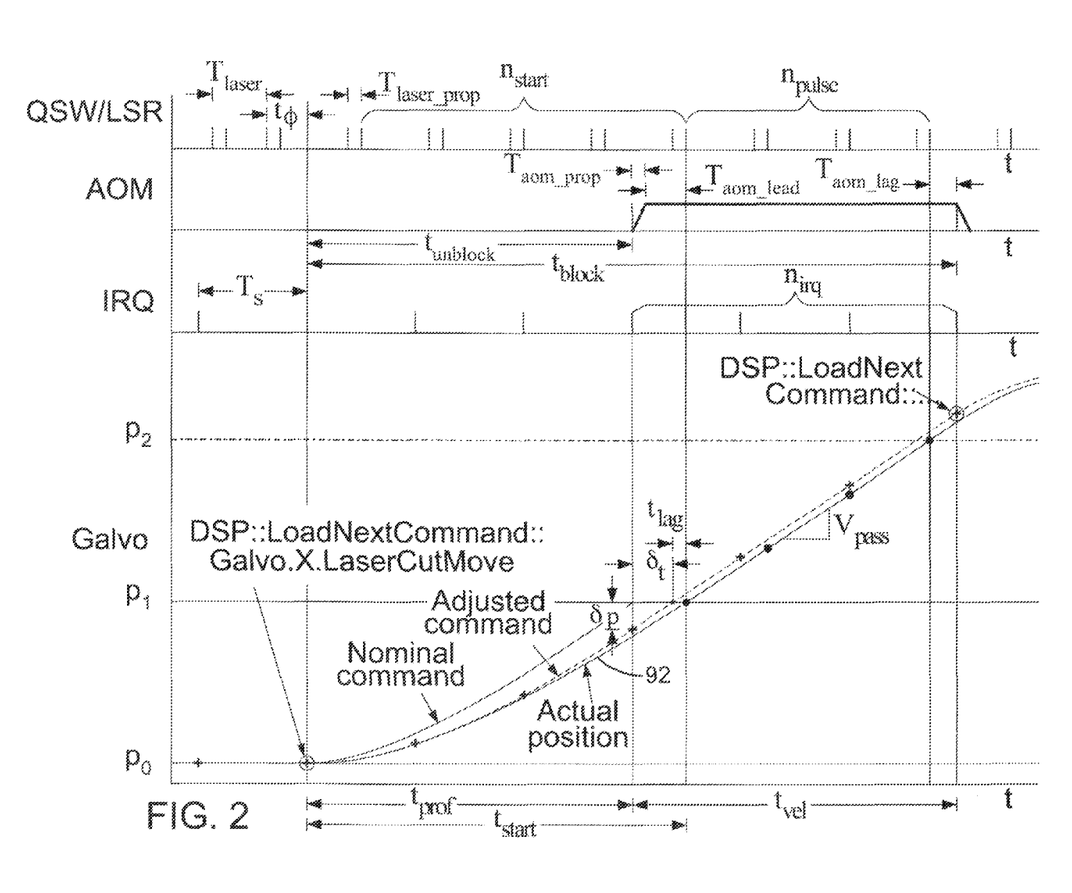
FIG. 2 is an exemplary timing graph of laser pulses and various beam propagation and positioning-system components for achieving a laser pass on a workpiece.

FIG. 2 is an exemplary timing graph of laser pulses and various beam propagation and positioning system components for achieving a laser pass along a cutting path 92 on the workpiece 26. With reference to FIG. 2, in some embodiments, the goal is to cut a line along the cutting path 92 with the laser between two points such that the endpoint laser pulses land exactly on the start and end positions of the cutting path 92 specified by $p_1$ and $p_2$. Using a laser 28 with a fixed repetition rate $f_{laser}$, the nominal pulse separation $\Delta p_{pulse}$ and pass velocity $V_{pass}$ are specified independently because they depend on each other. For a position-based recipe, the nominal pass velocity is:

$$V_{pass} = \Delta p_{pulse} f_{laser} \quad (1)$$

Alternatively, for a velocity-based recipe, the nominal pulse separation is:

$$\Delta p_{pulse} = V_{pass} f_{laser} \quad (2)$$

In either case, the number pulses that will be laid down along the cutting path 92 is:

$$N_{pulse} = (\text{round}(p_2 - p_1)/\Delta p_{pulse})) + 1 \quad (3)$$

where the round( ) function generates an integer value by rounding fractions up above 0.5 and the +1 is added to put an extra pulse at the end of the cutting path 92.

Quantization effects in the FPGA dictate that if an externally triggered Q-switched laser is controlled by the FPGA, the actual repetition period of the laser will be:

$$T_{laser} = (\text{round}(T^{\sim}_{laser}/T_{fpga})) T_{fpga} \quad (4)$$

where $T_{laser} = 1/f_{laser}$.

The actual pass velocity after quantization effects of the laser repetition rate is then calculated from:

$$V_{pass} = (p_2 - p_1)/((N_{pulse} - 1) T_{laser}) \quad (5)$$

The number of laser pulses that will elapse during the profile segment of the move is:

$$n_{start} = \text{floor}(t_{prof}/T_{laser}) \quad (6)$$

where the floor( ) function generates an integer value by discarding the fractional value of the number.

In some embodiments, it may be desirable that the constant velocity segment of the pattern 90 will end within a single DSP interrupt after the last laser pulse arrives at the end of the cutting path 92, i.e.:

$$n_{irq} T_s \leq n_{pulse} T_{laser} \leq (n_{irq} + 1) T_s \quad (7)$$

where $n_{irq}$ is the number of DSP interrupts that will elapse during the constant velocity segment of the move in pattern 90. This relationship can be maintained if $n_{irq}$ is chosen as:

$$n_{irq} = \text{floor}((n_{pulse})(T_{laser}/T_s) + 1)) \quad (8)$$

At the start of the DSP interrupt cycle in which the move pattern 90 begins, the time until the first laser pulse will arrive at the surface 36 of the workpiece 26 just after the end of the profiled segment is:

$$T_{start} = ((n_{start} + 1) T_{laser}) + (T_{laser\_prop} - t_\phi) \quad (9)$$

where the laser pulse phase offset $t_\phi$ is maintained in an FPGA register and read by the DSP.

The lag time between position command to the galvanometer servo loop and the actual position of the beam axis 24 as directed by the galvanometer mirrors 70 can be approximated by:

$$T_{lag} = K_{lag} V_{pass} \quad (10)$$

The laser scaling $K_{lag}$ can be characterized independently over range of pass velocities.

Projecting the position of the beam axis 24 on the workpiece 26, as directed by the galvanometer mirrors 70, forward in time and accounting for the estimated galvanometer lag, an adjustment to the time the command will reach $p_1$ is then:

$$\delta_t = t_{start} - t_{prof} + t_{lag} \quad (11)$$

Note that in equation (11) the galvo lag time $t_{lag}$ is added rather than subtracted from the right hand side of the equation to account for the direction of the lag in time.

The adjustment to the final position of the profiled move segment $\delta_p$ that is applied such the first pulse lands $p_1$ is then computed by projecting backward in time for the first laser pulse:

$$\delta_p = -V_{pass} \delta_t \quad (12)$$

Finally, the AOM unblock and block times relative to the start of the profiled move segment are calculated by:

$$T_{unblock} = t_{start} - t_{aom\_lead} - T_{aom\_prop} \quad (13)$$

and $$T_{block} = t_{start} + ((n_{pulse} - 1) T_{laser}) + T_{aom\_lag} \quad (14)$$

The AOM unblock and block times can be computed as a floating-point operation and then cast to an integer number of FPGA clock cycles, such that:

$$n_{unblock} = \text{round}(T_{unblock}/T_{laser}) \quad (15)$$

and $$n_{block} = \text{round}(T_{block}/T_{laser}) \quad (16)$$

The resulting numbers would then be used in an FPGA timer to gate the AOM commands relative to the cycle in which $t_\phi$ was read.

Figure 3:
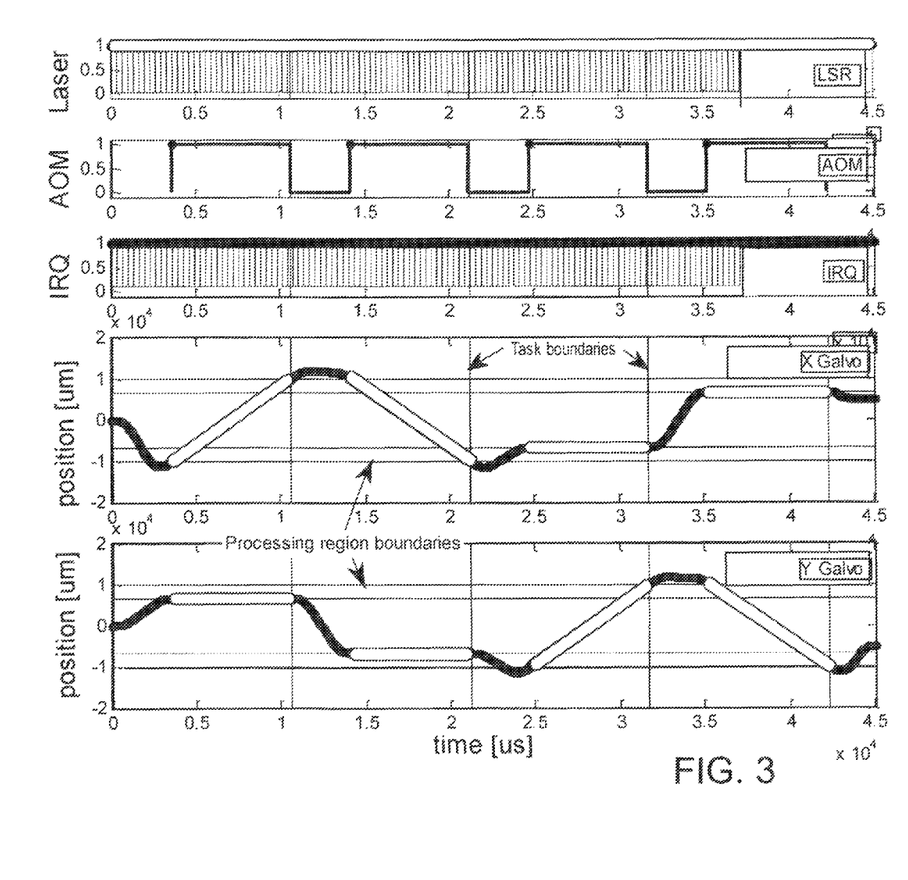
FIG. 3 is a timing diagram of laser pulses and various beam propagation and positioning-system components in a simulation of an exemplary laser pass of a galvanometer mirror route over a scan field of a galvanometer mirror.

To validate some of these embodiments, a simulation was conducted to emulate the behavior of the FPGA and DSP interrupt logic. Closely mimicking the real-time controller/galvanometer embedded software (TaskProcessor, Servo-Thread, etc.), the simulation was used to capture the QSW, IRQ, AOM pulse trains, and beam axis positions versus time at the FPGA clock frequency level.

FIG. 3 illustrates a timing diagram of the simulation for a single pass along different segments of a cutting path 92 within a selected (galvanometer mirror-directed) beam axis route through a scan field 72 over a workpiece 26. The top three plots are intended to illustrate the pulse trains generated by the FPGA at 100 MHz and laser pulses at 140 kHz; and the lower two plots illustrate the galvanometer-directed beam axis positions as the beam axis 24 scans back and forth across the processing field, updated at 20 kHz. However, for clarity, the spacing between the laser pulses shown in the top laser plot has been exaggerated. Moreover, Q-switch triggering signals are not shown but occur in the white area between each of the laser pulses. In some embodiments, however, the Q-switch triggering and laser pulsing may be arrested between cutting runs as long as the Q-switch triggering and laser pulsing are reactivated sufficiently in advance of a cutting segment to re-establish consistent and predicable laser pulse parameters.

Similarly, the spacing between the IRQ signals has been exaggerated. The laser pulses run autonomously at a constant rate, while the IRQ signals have their own frequency and have discontinuities.

Figure 5:
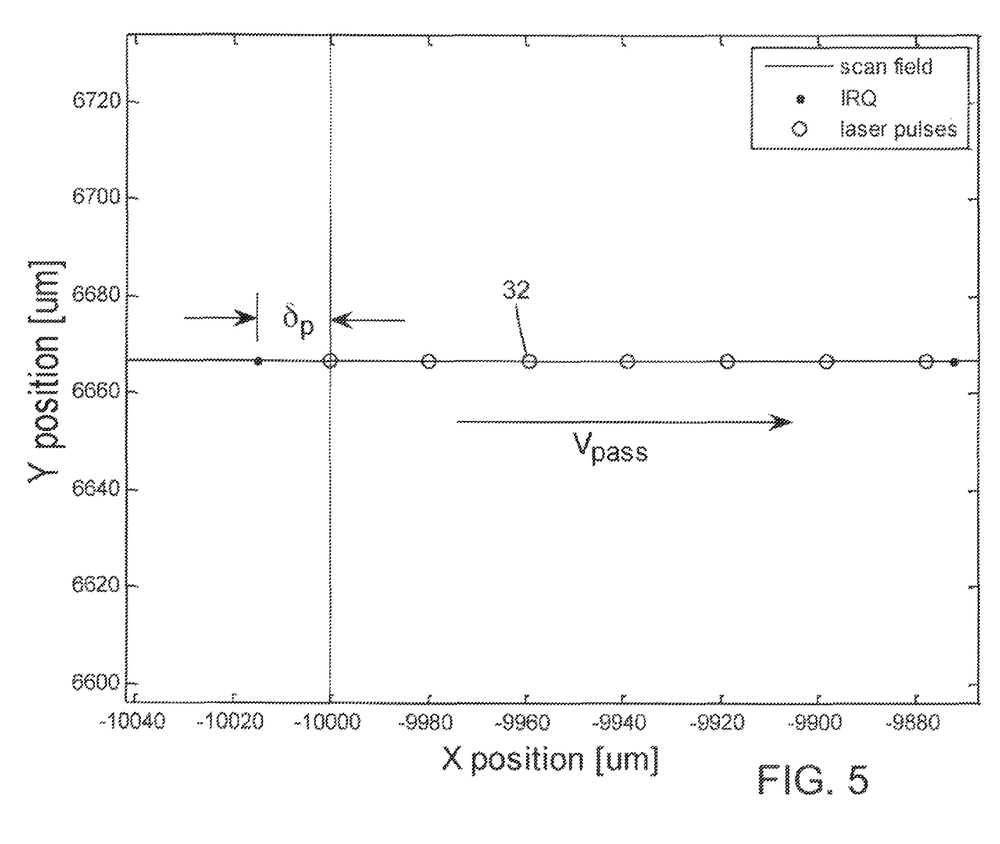
FIG. 5 is a top plan view of an enlarged portion of the move pattern of FIG. 4, showing relative positions of the laser pulses at the start of a laser pass.

FIG. 4 is a top plan view of a representative move pattern 90 of a laser beam axis 24 across a two-axis scan field 72 of galvanometer mirrors 70, and FIG. 5 is a top plan view of an enlarged portion of the move pattern 90 of FIG. 4, showing relative positions of the laser pulses at the start of a laser pass. With reference to FIG. 4, the cutting paths 92 form four streets segments that are processed in different directions. The pulse-picking device in conjunction with the pulse consistency and positioning capability provided by the techniques disclosed herein can be advantageously deployed to prevent over processing of the intersections of the street segments.

With reference to FIGS. 4 and 5, the nominal pass velocity $v_{pass}$ and the laser pulse separation specified from the recipe on the SSC were 2850 mm/s and 20.36 µm, respectively. After adjustment by the real-time software to meet the constraints of the DSP and the laser repetition rates, these values became 2852 mm/s and 20.00 µm, and the resulting position adjustment to the profiled move $\delta_p$ for this particular pass was 14.89 µm.

Figure 6A:
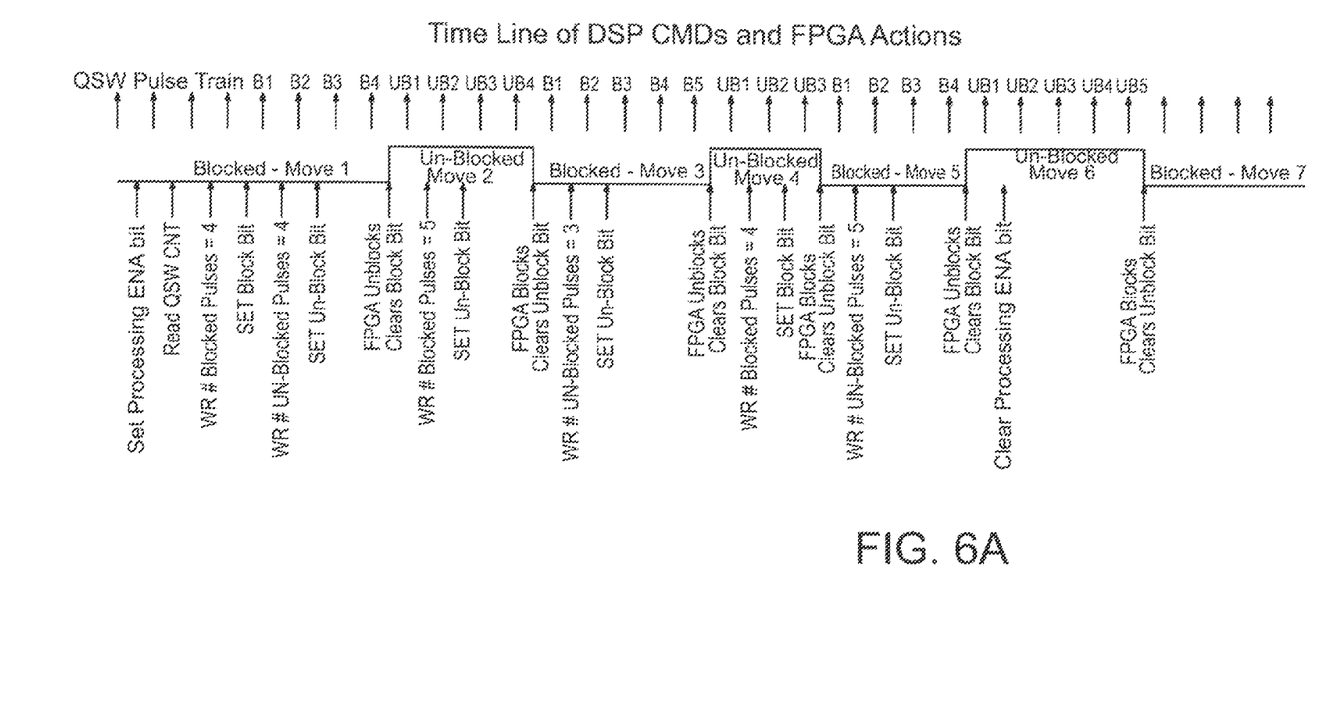
FIG. 6A is a timing diagram of exemplary real-time state logic in a digital signal processor for implementing some of the disclosed methodology.

FIG. 6A is a timing diagram of exemplary real-time state logic in a digital signal processor for implementing some of the disclosed methodology. A more concise process flow of steps might include: 1) trigger laser at constant parameters, 2) compute timing offsets for syncing, 3) compute $\delta_p$ and $\delta_t$ in real time, 4) adjust profile command with respect to position and time, and 5) execute.

Figure 6B:
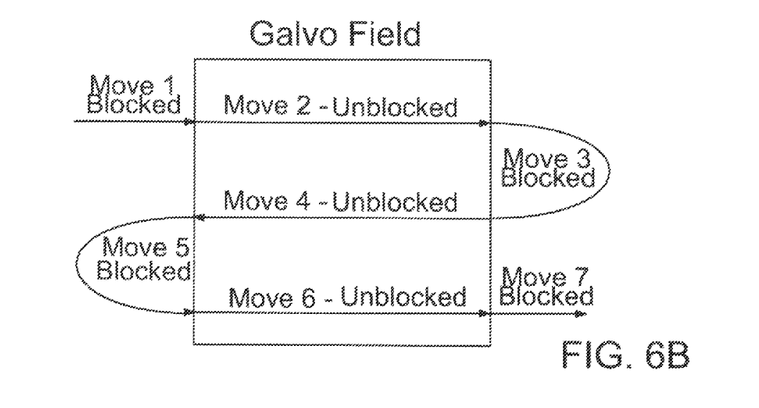
FIG. 6B shows the coordination of beam axis movement and pulse picker operation as represented by the timing diagram of FIG. 6A over a utilizable scan field.
Figure 6C:
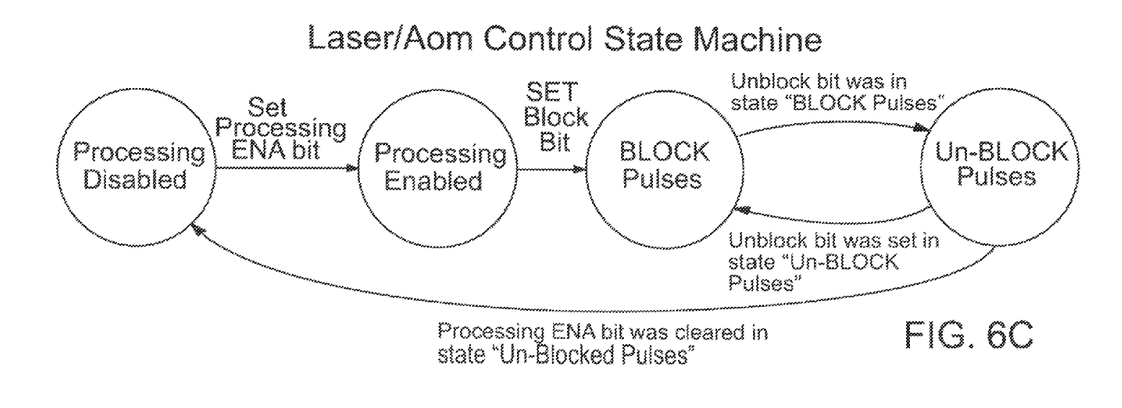
FIG. 6C is a general flow diagram, showing exemplary instructions to the pulse-picking device with respect to the example of FIG. 6A.

FIG. 6B shows the coordination of beam axis movement and pulse-picker operation as represented by the timing diagram of FIG. 6A over a utilizable scan field 72. FIG. 6C is a general flow diagram, showing exemplary instructions to the pulse-picking device 68 with respect to the example of FIG. 6A.

It will be appreciated that the techniques disclosed herein can be useful for laser marking, laser scribing, or laser via drilling, as well as for any laser cutting operation. In addition, the techniques disclosed herein can employ with a variety of other cutting techniques, such as the segmented cutting techniques described in U.S. Pat. No. RE 43,440 of James N. O'Brien et al., which is incorporated herein by reference.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A method for coordinating beam axis position and beam axis velocity with laser emission at a constant laser pulse repetition rate, comprising:

generating a beam of laser pulses at a constant laser pulse repetition rate for propagation along an optical path from a laser;

employing a beam positioning system including a fast positioner that is positioned along the optical path and operable for directing a beam axis of the optical path in a movement pattern over a workpiece, wherein the movement pattern includes directing the beam axis over noncutting areas on the workpiece and directing the beam axis at a beam axis velocity over a cutting path between start and end positions relative to the workpiece to deliver the laser pulses at the laser pulse repetition rate and at an irradiance to change a physical characteristic of the workpiece along the cutting path;

employing a pulse-picking device to allow or prevent selected ones of the laser pulses from propagating along the optical path to the workpiece, wherein the laser pulses that are allowed to propagate to the workpiece are working laser pulses, and wherein the laser pulses that are prevented from propagating to the workpiece are nonworking laser pulses;

employing a controller operable for receiving laser processing parameters for changing the physical characteristic of the workpiece and for providing control signals directly or indirectly to the laser, the beam-positioning system, and the pulse-picking device, wherein the laser processing parameters include or determine the laser pulse repetition rate, the cutting path, the beam axis velocity, and the irradiance;

employing a timing device associated with the controller, wherein the timing device is operable to cause laser triggering signals to be sent to the laser triggering device at a constant repetition rate to cause the laser pulse repetition rate of the laser to be constant, thereby to cause emission of the laser pulses to be constant so that they exhibit stable and predictable pulse characteristics; and employing processing circuitry associated with the controller and operable for providing fast positioner control signals to the fast positioner to direct the beam axis to move along the cutting path over the workpiece; wherein, based on the laser pulse repetition rate, the processing circuitry is operable cause the beam axis to be directed to the start position relative to the workpiece and to be moving at the beam axis velocity when a first one of the working laser pulses impinges the workpiece; and wherein one or more pulse-picker signals gated through the timing device are operable to cause the pulse-picking device to prevent propagation of nonworking laser pulses over noncutting areas of the workpiece and to permit propagation of working laser pulses to impinge the workpiece over the cutting path including and between the start and end positions relative to the workpiece.

2. The method of claim 1, wherein the processing circuitry is operable to account for laser pulse propagation delay between transmission of the pulse-picker signal and arrival of the first one of the working laser pulses along the cutting path at the surface of the workpiece.

3. The method of claim 1, wherein the processing circuitry is operable to account for pulse-picker propagation delay between transmission of the pulse-picker signal and operational ability of the pulse picker to switch from preventing propagation of nonworking laser pulses to allowing propagation of working laser pulses over the workpiece.

4. The method of claim 1, wherein the processing circuitry is operable to account for fast positioner delay between transmission of the fast positioner control signals and direction of the beam axis to the start position relative to the workpiece at the beam axis velocity.

5. The method of claim 1, wherein the processing circuitry is operable to account for pulse-picker lead time between an effective change of the pulse picker from preventing propagation of nonworking laser pulses to allowing propagation of working laser pulses over the workpiece and the passage of the first working laser pulse through the pulse picking device.

6. The method of claim 1, wherein the processing circuitry is operable to account for pulse-picker lag time between an effective change of the pulse picker from allowing propagation of working laser pulses to preventing propagation of nonworking laser pulses over the workpiece and the passage through the pulse picker of the working laser pulse impinging the end position of the cutting path over the workpiece.

7. The method of claim 1, wherein the fast positioner has a utilizable scan field that is large enough to contain the movement pattern, and wherein the fast positioner is operable to repeat the movement pattern over multiple passes within the utilizable scan field.

8. The method of claim 1, wherein the workpiece is sufficiently large to include first and second adjacent utilizable scan fields of the fast positioner, wherein the end position of a first cutting path in the first scan field is adjacent to the start position of a second cutting path in the second scan field, and wherein the physical characteristic changed by laser impingement is the same along the first cutting path, the second cutting path, and at their connection point.

9. The method of claim 1, wherein: the laser triggering device comprises a Q-switch, and/or the fast positioner comprises a pair of galvanometer mirrors, and/or the pulse-picking device comprises an AOM, and/or the timing device comprises a field programmable gate array, and/or the processing circuitry comprises a digital signal processor, and/or the workpiece has a thickness of less than 1 mm.

10. The method of claim 1, wherein the fast positioner has a fixed position within the laser machining system, and wherein the workpiece is supported by a stage that moves relative to the fixed position of the fast positioner.

11. A laser machining system for processing a workpiece having a surface, comprising:
   a laser including a laser triggering device operable for causing emission of laser pulses at a laser pulse repetition rate for propagation along an optical path from the laser;
   a beam-positioning system including a fast positioner that is positioned along the optical path and operable for directing a beam axis of the optical path in a movement pattern over a workpiece, wherein the movement pattern includes directing the beam axis over noncutting areas on the workpiece and directing the beam axis at a beam axis velocity over a cutting path between start and end positions relative to the workpiece to deliver the laser pulses at the laser pulse repetition rate and at an irradiance to change a physical characteristic of the workpiece along the cutting path;
   a pulse-picking device that is positioned along the optical path and that is operable for allowing or preventing selected ones of the laser pulses from propagating along the optical path to the workpiece, wherein the laser pulses that are allowed to propagate to the workpiece are working laser pulses, and wherein the laser pulses that are prevented from propagating to the workpiece are nonworking laser pulses;
   a controller operable for receiving laser processing parameters for changing the physical characteristic of the workpiece and for providing control signals directly or indirectly to the laser, the beam-positioning system, and the pulse-picking device, wherein the laser processing parameters include or determine the laser pulse repetition rate, the cutting path, the beam axis velocity, and the irradiance;
   a timing device in communication with the controller, wherein the timing device is operable to cause laser triggering signals to be sent to the laser triggering device at a constant repetition rate to cause the laser pulse repetition rate of the laser to be constant, thereby to cause emission of the laser pulses to be constant so that they exhibit stable and predictable pulse characteristics; and
   processing circuitry associated with the controller and operable for providing fast positioner control signals to the fast positioner to direct the beam axis to move along the cutting path over the workpiece; wherein, based on the laser pulse repetition rate, the processing circuitry is operable cause the beam axis to be directed to the start position relative to the workpiece and to be moving at the beam axis velocity when a first one of the working laser pulses impinges the workpiece; and wherein one or more pulse-picker signals gated through the timing device are operable to cause the pulse-picking device to prevent propagation of nonworking laser pulses over noncutting areas of the workpiece and to permit propagation of working laser pulses to impinge the workpiece over the cutting path including and between the start and end positions relative to the workpiece.

12. The laser machining system of claim 11, wherein the processing circuitry is operable to account for laser pulse propagation delay between transmission of the pulse-picker signal and arrival of the first one of the working laser pulses along the cutting path at the surface of the workpiece.

13. The laser machining system of claim 11, wherein the processing circuitry is operable to account for pulse-picker propagation delay between transmission of the pulse-picker signal and operational ability of the pulse picker to switch from preventing propagation of nonworking laser pulses to allowing propagation of working laser pulses over the workpiece.

14. The laser machining system of claim 11, wherein the processing circuitry is operable to account for fast positioner delay between transmission of the fast positioner control signals and direction of the beam axis to the start position relative to the workpiece at the beam axis velocity.

15. The laser machining system of any one of claims claim 11, wherein the processing circuitry is operable to account for pulse-picker lead time between an effective change of the pulse picker from preventing propagation of nonworking laser pulses to allowing propagation of working laser pulses over the workpiece and the passage of the first one of the working laser pulses through the pulse picking device along the cutting path.

16. The laser machining system of any one of claims claim 11, wherein the processing circuitry is operable to account for pulse-picker lag time between an effective change of the pulse picker from allowing propagation of working laser pulses to preventing propagation of nonworking laser pulses over the workpiece and the passage through the pulse picker of the working laser pulse impinging the end position of the cutting path over the workpiece.

17. The laser machining system of any one of claims claim 11, wherein the fast positioner has a utilizable scan field that is large enough to contain the movement pattern, and wherein the fast positioner is operable to repeat the movement pattern over multiple passes within the utilizable scan field.

18. The laser machining system of any one of claims claim 11, wherein the workpiece is sufficiently large to include first and second adjacent utilizable scan fields of the fast positioner, wherein the end position of a first cutting path in the first scan field is adjacent to the start position of a second cutting path in the second scan field, and wherein the physical characteristic changed by laser impingement is the same along the first cutting path, the second cutting path, and at their connection point.

19. The laser machining system of any one of claims claim 11, wherein: the laser triggering device comprises a Q-switch, and/or the fast positioner comprises a pair of galvanometer mirrors, and/or the pulse-picking device comprises an AOM, and/or the timing device comprises a field programmable gate array, and/or the processing circuitry comprises a digital signal processor, and/or the workpiece has a thickness of less than 1 mm.

20. The laser machining system of any one of claims claim 11, wherein the fast positioner has a fixed position within the laser machining system, and wherein the workpiece is supported by a stage that moves relative to the fixed position of the fast positioner.

\* \* \* \* \*